(12) United States Patent
Corn et al.

(10) Patent No.: US 6,706,373 B2
(45) Date of Patent: Mar. 16, 2004

(54) DIGITAL PLACARD PRODUCTION PROCESS

(75) Inventors: Frederick C. Corn, Grayson, GA (US); David E. Downey, Jonesboro, GA (US); Joel A. Freeland, Marietta, GA (US); Matthew J. Gillard, Sharpsburg, GA (US); Donnie L. Holland, Douglasville, GA (US); Mark H. Lowery, Fayetteville, GA (US); Michael S. McGraw, Lilburn, GA (US); Jay T. Pullen, Jonesboro, GA (US); Jerry P. Wright, McDonough, GA (US)

(73) Assignee: Delta Air Lines, Inc., Atlanta, GA (US)

(*) Notice: Subject to any disclaimer, the term of this patent is extended or adjusted under 35 U.S.C. 154(b) by 0 days.

(21) Appl. No.: 09/796,352

(22) Filed: Mar. 2, 2001

(65) Prior Publication Data

US 2002/0122921 A1 Sep. 5, 2002

(51) Int. Cl.⁷ .................. B32B 23/02; B32B 3/00; B32B 7/12; B41M 3/12
(52) U.S. Cl. .................. 428/195.1; 428/202; 428/352; 40/124.191
(58) Field of Search .................. 428/195.1, 202, 428/352; 427/146, 147; 40/124.191

(56) References Cited

U.S. PATENT DOCUMENTS

| | | | | |
|---|---|---|---|---|
| 4,735,827 A | * | 4/1988 | Frank et al. | 427/264 |
| 4,759,982 A | * | 7/1988 | Jenssen et al. | 428/343 |
| 5,710,095 A | * | 1/1998 | Horsten | 503/210 |
| 6,015,615 A | * | 1/2000 | Sanchez et al. | 428/352 |
| 6,077,611 A | * | 6/2000 | Griswold et al. | 428/423.3 |

* cited by examiner

*Primary Examiner*—Cynthia H. Kelly
*Assistant Examiner*—L Ferguson
(74) *Attorney, Agent, or Firm*—Birch, Stewart, Kolasch & Birch, LLP

(57) ABSTRACT

Thermal printing provides an advantageous route to producing aircraft placards able to withstand the rigorous conditions existing on aircraft exteriors. A graphic is directly printed onto a substrate such as polyester, vinyl or polycarbonate. The placard is protected by a protective layer of a UV curable ink which contains acrylates and silicone. An optional promoter containing a diisocyante can be added to the protective layer. Ultraviolet radiation is used to cure the protective layer. The resulting thermally printed placard performs equally as well as silk screen printed placards while offering economic and environmental advantages.

6 Claims, 5 Drawing Sheets

US 6,706,373 B2

DIGITAL PLACARD PRODUCTION PROCESS

FIELD OF THE INVENTION

The invention relates to a digital placard suitable for mounting on airplanes, wherein the placard is made using a thermal digital printer and covered with a protective coating.

BACKGROUND OF THE INVENTION

Aviation places significant stress on graphic arts materials such as placards. An aircraft placard is a text and/or graphic decal that communicates information, corporate image and aircraft identification to people who work with and support the aircraft. A placard placed on the exterior of an airplane will be subjected to extremes of heat and cold, dryness and wetness, pressure variations, and also be exposed to significant amounts of ultraviolet light when the airplane is at high elevations. As a result, the maintenance and replacement of aircraft exterior markings represents a considerable expenditure of time and money.

A typical method for producing placards or transfer graphics with sealed edges is discussed in U.S. Pat. No. 4,759,982 to Jennsen et al. U.S. Pat. No. 4,759,982 pertains to a process for preparing a transfer graphic article having a protective clear coat in precise registration such that the graphic article has rounded and sealed edges. The edges of the underlying adhesive are sealed by the clear coat such that improved solvent resistance is achieved. Jennsen et al. fails to disclose how the graphic aspect of the article is generated or that the shape of the cut defining the shape of the article. Example 4 of Jennsen et. al discusses the use of an aliphatic urethane acrylate in a clear coat formulation, but when combined with wet ink printing and a 3 minute drying time, this would not be a rapid process.

The application of thermal printing techniques to the produce aircraft exterior markings and placards has the potential to provide a superior product at low cost. However, the extreme conditions associated with aviation applications represent significant problems which must be overcome in order for this technology to be utilized.

Thermal printers are used to print on a variety of non-paper substrates (films). The printer is somewhat similar to a typewriter. A selected colored ribbon, which can be 12 inches wide, is loaded into the printer. The ribbon can be a plastic sheet with a coating of pigment applied to one side. The printer is loaded with the selected substrate for the application. A print head is commanded by a computer system. The print head is a pixeled thermal head. The thermal pixels make contact with the ribbon, and the heat causes the resin to release from the ribbon to the substrate in the form of the computer commanded graphic.

Typical thermal ribbon printing technology is discussed in U.S. Pat. No. 5,803,627 to Paranjpe. U.S. Pat. No. 5,803,627 discusses the transfer of ink caused by electrical pulse which are transmitted to a thermal head. The thermal energy brings about the transfer of the resin onto the substrate. However this technology requires a sublimation dye or an encapsulated radiation resistant dye. These dyes would be expected to have poor stability when exposed to the rigorous conditions of aviation applications.

There are many disadvantages associated with the currently used silk screen processes used to manufacture aircraft placards. Silk screening is slow and labor intensive. As a result, silk screen placards are costly to produce. Solvents such as acetone are used during silk screening, and the shop personnel can be exposed to these solvents. In contrast, thermal transfer uses no solvents. Thermal transfer also uses computer technology to generate and transfer the image, significantly reducing initial set-up time for each color. As a result, thermal transfer technology promises to produce a low cost aircraft placard with reduced environmental hazards.

SUMMARY OF THE INVENTION

The invention, in part, pertains to a digital placard made using a thermal digital printer. After printing, the placard is coated with a protective layer or ink. The protective layer is cured using ultraviolet light. The protective layer or ink can contain an adhesion promoter such as polymeric hexamethylene diisocyanate.

The invention, in part, pertains to a thermally digital printed placard coated with an ink containing 45–70% acrylates, 15–30% resin mixtures, 0–35% pigments, 0–2% alkylamine such as methyldiethanolamine, up to 5% photoinitiators, and up to 2% antifoam. The ink is cured using ultraviolet light. The ink can also optionally contain an adhesion promoter such as polymeric hexamethylene diisocyanate.

The invention, in part, pertains to a digital placard to be applied to an aircraft. The digital placard is made using a thermal digital printer. After printing the placard is coated with a protective ink using a silk screen process. The ink is instantly cured when it is exposed to ultraviolet light. The silk screen ink can contain an adhesion promoter such as polymeric hexamethylene diisocyanate. The digital placard is applied to the airplane, and the edges are sealed using an edge sealer.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION

Advantages of the present invention will become more apparent from the detailed description given herein after. However, it should be understood that the detailed description and specific examples, while indicating preferred embodiments of the invention, are given by way of illustration only, since various changes and modification within the spirit and scope of the invention will become apparent to those skilled in the art form this detailed description.

Figure 1:
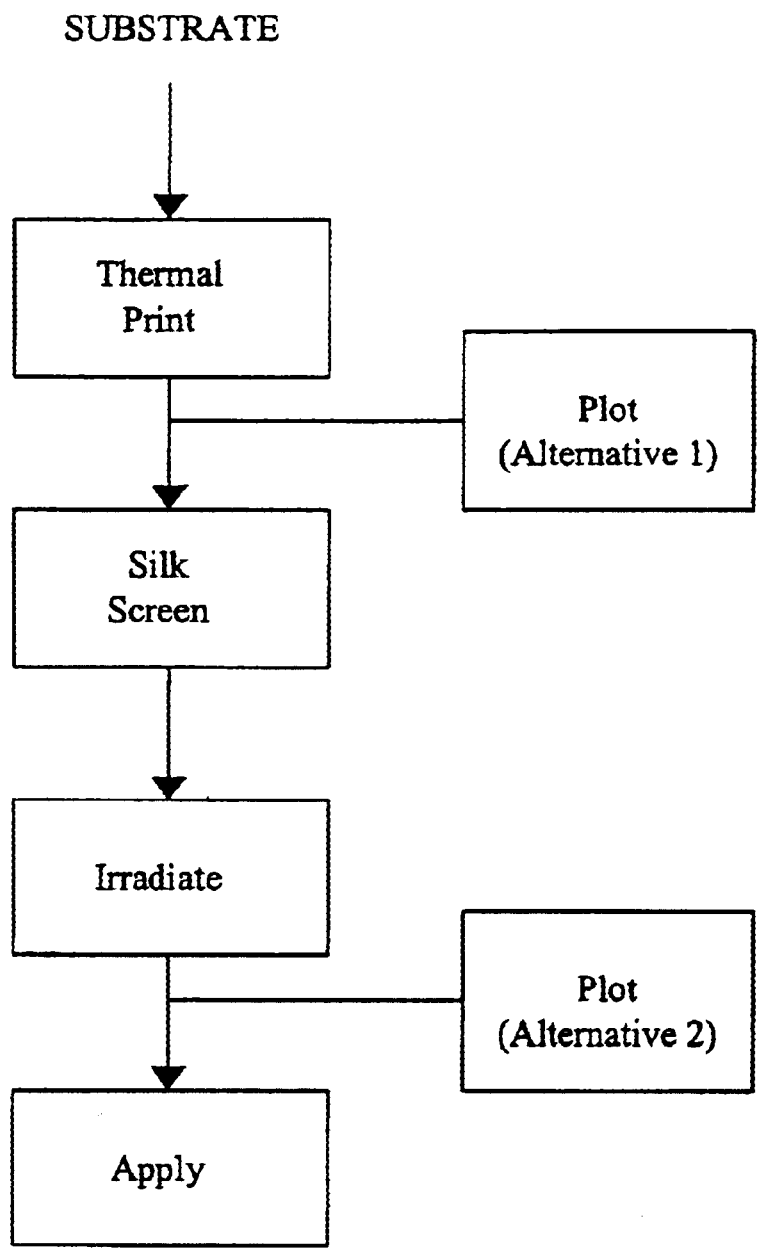
FIG. 1 is a process flow diagram of the method of preparing the digital placard.

FIG. 1 show a process flow diagram for the production of the digital placard of the invention. A substrate is fed to a digital thermal printer. A computer in the digital thermal printer commands the thermal printing head to apply lettering or a graphic to the substrate. The thermal printing head applies pixel heating to a ribbon carrying resin, thereby transferring the resin to the substrate. Different ribbons can be used to transfer different color and types of resin. The digital thermal printer is capable of transferring high quality printing and images to the substrate.

A typical thermal printer is the GERBER EDGE™ or a GERBER MAXX™ thermal printer, Gerber Scientific Products, South Windsor, Conn. The thermal printer uses thermal foils coated with resin-based pigments, and requires no liquids, toners or other chemicals that require disposal. A single foil can be loaded at one time on the GERBER EDGE™. Up to six foils can be simultaneously loaded into GERBER MAXX™. A computer guided thermal print head transfers the image onto the substrate. A typical print speed is 30 inches per minute at 600×300 dpi. The thermal printer such as the GERBER MAXX™ can accommodate materials up to 36 inches wide. Other thermal printers, such as the GERBER EDGE™, can accommodate materials up to 15 inches wide.

After the substrate is printed. The substrate is coated with an ultra-violet activated ink. A typical example of the UV ink is NAZDAR 3700 series all purpose screen ink, of which NAZDAR 3727 is an example. The UV ink can optionally contain from 1% to 10% by volume of a diisocyanate promoter. A typical promoter is NAZDAR NB-80 adhesion promoter. Silk screen printing is the preferred process used to coat the ink onto the printed substrate. However, other methods to transfer the ink can be utilized. The coated substrate is then irradiated with ultraviolet radiation to cure the ink. Although the ink is cured virtually instantaneously, when the optional diisocyanate promoter is used, aging the placard for up to 6 days will maximize the chemical resistance of the placard. The placards are finished by cutting with a computer controlled plotter. Plotting can be performed either before or after the protective coating process.

The finished placard can then be applied to the aircraft structure such as a wing or fuselage section. This can be done by removing the backing from the adhesive on the substrate and pressing the substrate onto the aircraft structure. A squeegee can be used to apply the placard to the aircraft structure. Additionally, an edge sealer can be used to apply an seal around the edges of the placard to promote adhesion of the placard to the aircraft structure and to seal the placard. A typical edge sealer is PRC DESOTO CA8000/C900B clear polyurethane edge sealer.

Figure 2:
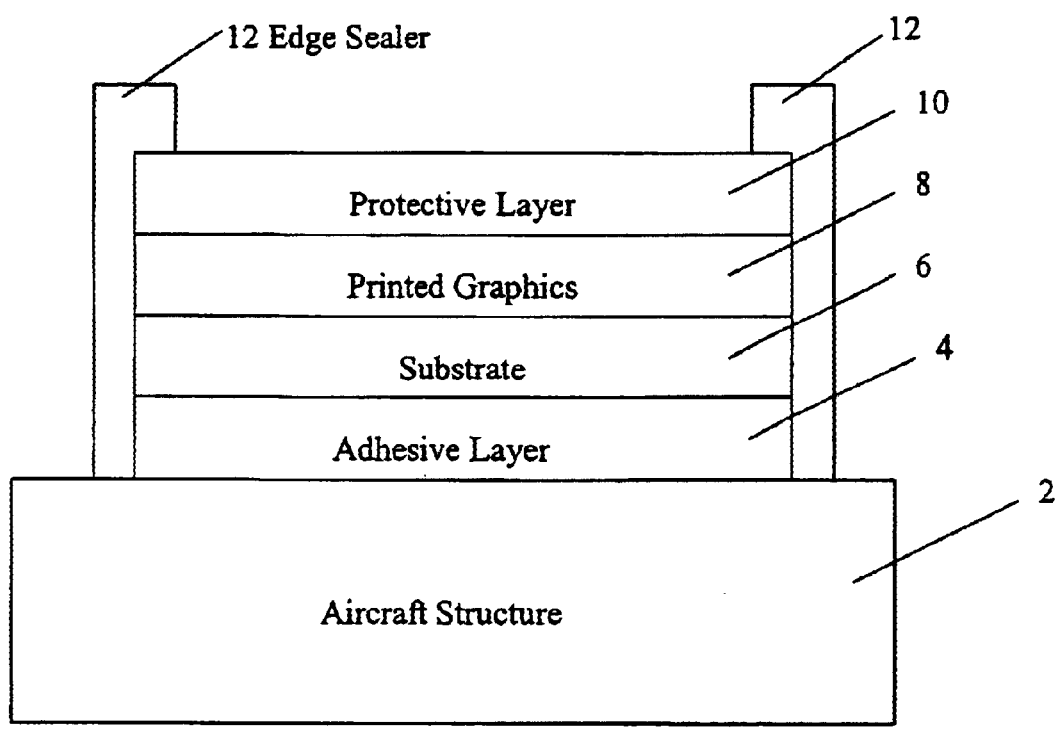
FIG. 2 is a cross sectional diagram of the digital placard mounted on an aircraft structure.

FIG. 2 shows the finished digital placard applied to an aircraft structure 2. The aircraft structure 2 can be a wing or a section of fuselage. Disposed on the aircraft structure 2 is a layer of pressure sensitive adhesive 4. The adhesive 4 can be any adhesive capable of withstanding the rigors of aircraft service. The adhesive can be a cured or uncured adhesive based upon natural and synthetic rubbers combined with natural or synthetic resins. Disposed on the adhesive layer 4 is the substrate 6. The printing or graphics 8 is printed on the substrate 6. Over the substrate 6 and printed graphics 8 is the protective layer 10, which is the cured UV printing ink. Disposed on layers 2 and 10 is a typical edge sealer 12. This typical edge sealer can be PRC DESOTO CA8000/B900B clear polyurethane edge sealer.

The UV all purpose screen ink is a silicone containing ink which can also contain 45–70% acrylates, 15–30% resin mixtures, 0–35% pigments, 0–2% alkylamine such as methyldiethanolamine, up to 5% photoinitiators, and up to 2% antifoam.

The acrylates can commonly be prepared from monomers of ethyl acrylate, n-butyl acrylate, 2-methoxyethyl acrylate, or 2 methoxyethyl acrylate.

Ultraviolet curing of coatings an printing inks is based on the photoinitiation of a radical and cationic polymerization. Photoinitiated radical polymerization of acrylate resins (monomers and oligomers) is employed. The utilization of monoacrylates yields a linear polymer. However, a UV cured crosslinked polymer is produced from mixtures of mono- and multiacrylates.

Photoinitiators absorb light in the UV-visible spectral range (250–450 nm) and convert this light energy into chemical energy in the form of reactive intermediates such as free radicals and reactive actions. Free radical photoinitiators can include benzophenone, benzyl and quinone derivatives. Photoinitiators for cationic polymerization can typically be triarylsulfonium and diaryliodonium salts with complex metal halide atoms. Photoinitiators can also be mixed arene cyclopentadienyl metal salts of complex metal halide anions such as ($\eta^6$-benzene) ($\eta^5$-cyclopentadienyl) Fe(II) hexaflourophosphate.

The silicone can be a synthetic polymer of the structure $(R_nSiO_{(4-n/2)})m$ where n=1–3 and m≧2. R can be methyl, longer alkyl, fluoroalkyl, phenyl, vinyl, hydrogen, chlorine, alkoxy, acyloxy or alkylamino.

The pigments in the ink can be either inorganic or organic, inorganic pigments include titanium dioxide, iron oxides, chromium oxide, lead chromates, lead molybdates, cadmium/selenium/mercury compounds, ultramarine and a variety of mixed metallic complexes. There are a wide variety of organic pigments. Organic pigments include the phthalocyanines and anthroquinones.

The optional adhesion promoter can be monomeric or polymeric hexamethylene diisocyanate (HDI:OCNC$_6$H$_{12}$NCO) or homopolymer of HDI (CAS# 28182-81-2). An example of the adhesion promoter is NAZDAR NB-80. The diisocyante adhesion promoter is not restricted to monomeric or polymeric hexamethylene diisocyante, but can also include other monomeric or polymeric diisocyanates of methylene diisocyanate, toluene diisocyanate (TDI), diphenylmethane-4,4'-diisocyanate, 1,5-naphthalene diisocyanate, isophorone diisocyanate, and methyl diphenyl diisocyanate (MDI). Preferably, the polymeric diisocyanate is used. Also, mixtures of diisocyanates can be used.

Polyester substrates are typically used for aircraft exterior markings. The polyester can be about 2–4 mil thick. A clear pressure sensitive adhesive can be applied to the film. The thickness of the polyester and the adhesive can typically be 4–6 mil. A liner, such as 96 pound, polyethylene coated paper can cover the adhesive layer.

Commercially available substrates of this type can include 3M™ VS7704 and 3M™ VS7705 Aircraft Exterior Marking Film. They are 2 mil polyester with a clear pressure sensitive adhesive. They are recommended for screen printing with 3M™ SCOTCHCAL™ ink series 1900 and 3900. Overprinting can be performed with 3M™ SCOTCHCAL™ 6620 or 6640.

Additional substrate materials can be LEXAN, polycarbonate or vinyl. A polyester/vinyl substrate can be used for interior surfaces. The polycarbonate film can be approximately 10 mil in thickness.

The protective coating can be classified as a photoinitiated modified acrylic resin ink. This UV ink rapidly cures into a clear protective coating when exposed to high intensity UV radiation. The optional HDI (hexamethylene diisocyanate) additive is added from about 1% to 10% with the ink. Preferably, from about 5% to 10% of the diisocyanate additive is added.

After the substrate is thermally printed, the UV ink and optional additive is applied to the substrate. Application of the mixture of ink and additive is preferably using a silk screen process. A framed and masked silk screen has the ink and additive mixture poured into the screen. The graphic printed substrate is then placed under the screen. A squeegee pulls the clear laminate ink across the screen making contact with the substrate below and allows the liquid laminate ink to pass through the screen and lay a film of liquid laminate coating to be applied to the substrate.

Application of the ink mixture is not restricted to silk screen printing. The ink mixture can also be applied using knife coating, roll coating, reverse roll coating, Mayer rod coating, gravure coating, dip coating and spray coating.

The ink mixture is cured by exposure to high intensity ultraviolet radiation. The coating substrate can be placed on a conveyer belt equipped with a overhead high intensity ultraviolet lamp. When the liquid laminated substrate passes under the lamp, the liquid ink rapidly (2–3 seconds) solidifies into a durable protective coating.

The cure is virtually instantaneous. However, when the diisocyanate promoter is utilized the full chemical resistance benefits are not observed up to 6 days after curing.

EXAMPLES

Comparative Examples were prepared using a silk screen process. SCOTCHCAL™ 3690 or 10 mil polycarbonate was used for making interior plastic placards. 3M™ Aircraft Exterior Marking Film VS7705 film or Avery Fasson vinyl or polyester film was used for exterior plastic placards. Silkscreen inks were chosen according to the background material used. GV/VF series inks can be used with SCOTCHCAL™ 3690, FASSON, MACTAC TESLIN white vinyl, 3650-114, 3M™ Aircraft Exterior Marking Film VS7705, 10 mil polycarbonate and vinyl coated fabric. Enamels can be used for 3M™ Aircraft Exterior Marking Film VS7705, metals, glass and fabrics.

Silk screening was performed by mixing the color ink selected, and pouring a small amount onto the screen. The ink is pulled across the screen image with a silk screen squeegee with smooth, even and firm pressure to transfer the ink image onto the background material. Excess ink is removed. The screen image is wiped with a cheesecloth moistened with acetone. The screen is untaped and the image is removed.

The thermal printing is performed using a GERBER EDGE™ thermal printer, Gerber Scientific Products, South Windsor, Conn. The appropriate colors of Gerber thermal transfer ribbon is selected as required by the drawing. The placard is manufactured according to the instructions provided by Gerber. For the finish and trim process, the interior vinyl placards are overlaid with clear polyester, MYLAR or FLEXCON for protection. The placards are laminated with clear polyester, MYLAR or clear FLEXCON using a laminator. Polycarbonate interior placards are backed with adhesive transfer tape for installation purposes. Digitally printed exterior polyester placards are overprinted with clear ink for protection. Silk screen inks can be used as outlined in the silk screen process. The UV inks are cured in an ultra violet cabinet.

The comparative example was 3M™ Aircraft Exterior Marking Film VS7705 silk screened with conventional ink for exterior placards. Nazdar red gloss vinyl ink was used for silk screening. The silk screened placard was coated with 3M™ 6620i clear overprint. Twenty four placards were screened.

The experimental placard was a thermally printed placard printed using the GERBER EDGE™ process. The placard was printed using Gerber red thermal transfer ribbon onto SCOTCHCAL™ VS7705 nonperforated film. The thermally printed placard was coated with a UV curable ink. The UV curable ink was NAZDAR 3727 clear. The ink was cured using UV radiation. Twenty four placards were printed.

Figure 3:
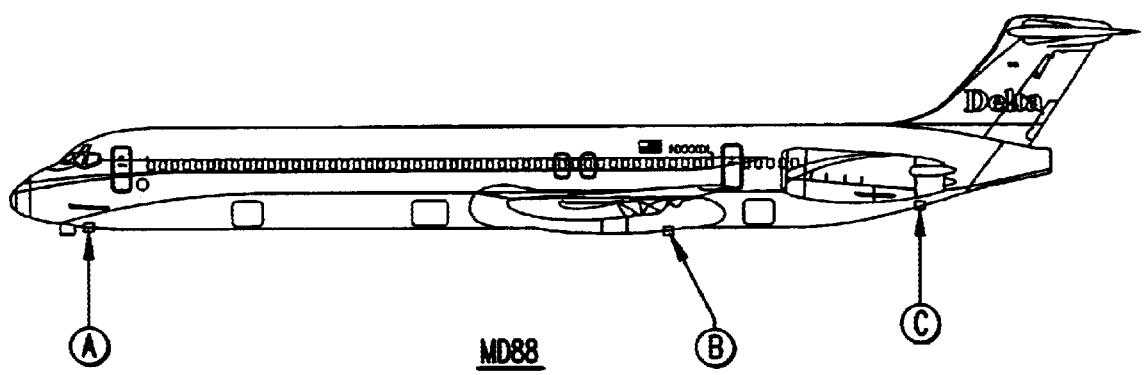
FIG. 3 shows the experimental mounting positions of the placards on two aircraft used for a service evaluation.
Figure 3:
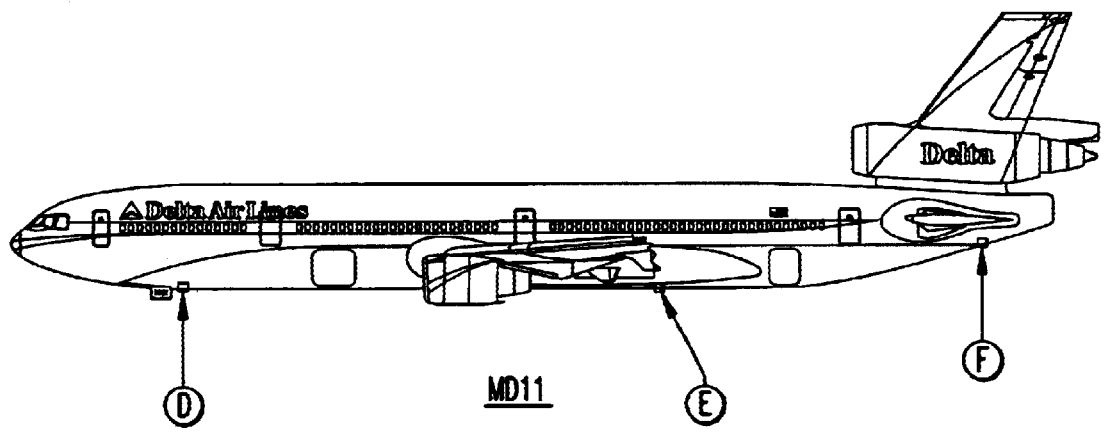
Figure 4:
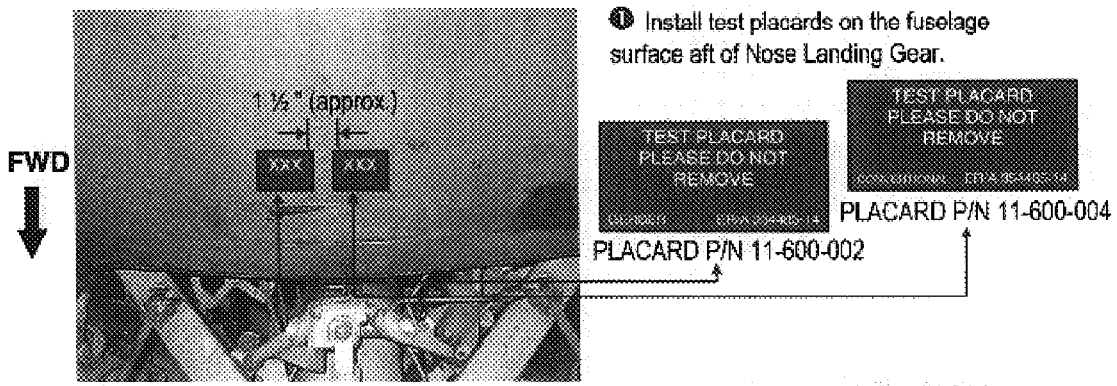
FIG. 4 shows experimental placards mounted on an MD88 aircraft.
Figure 4:
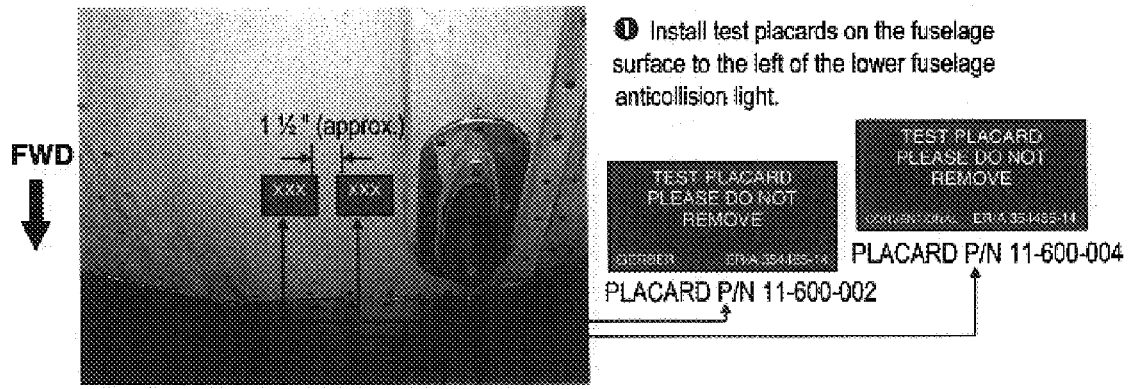
Figure 4:
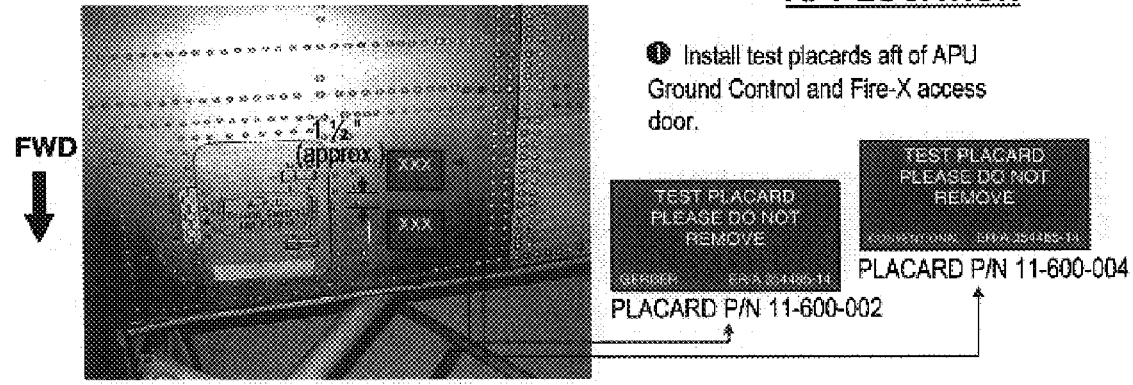
Figure 5:
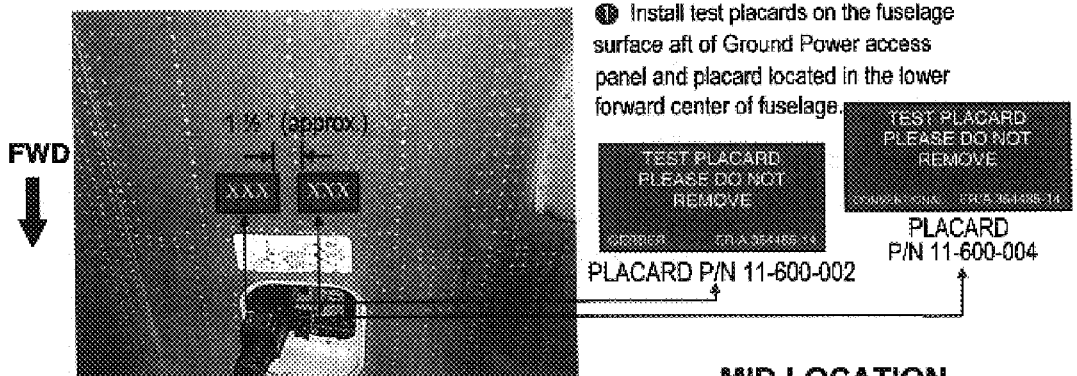
FIG. 5 shows experimental placards mounted on an MD11 aircraft.
Figure 5:
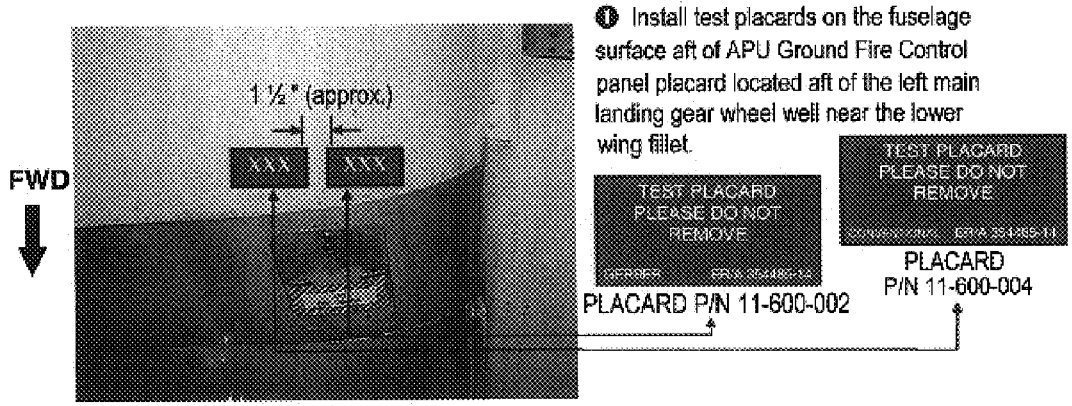
Figure 5:
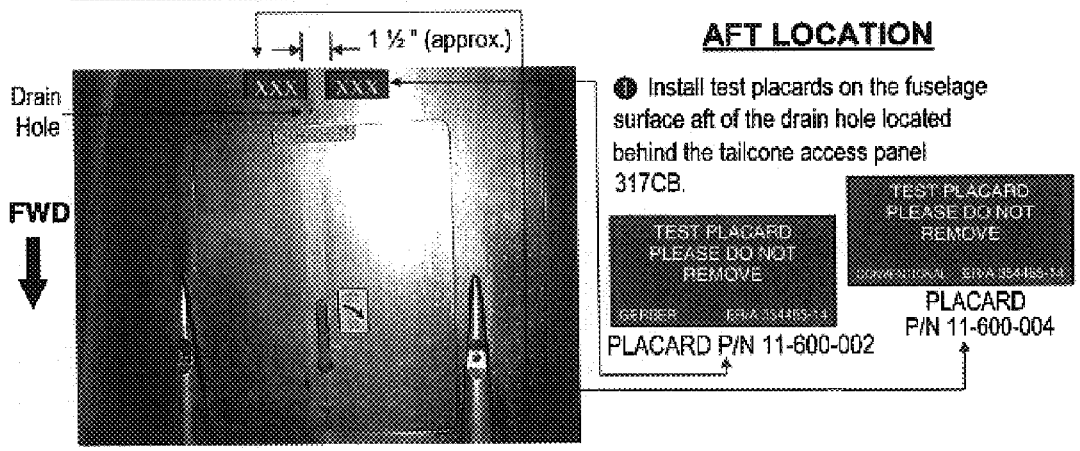

The placards were evaluated at forward, mid and aft locations on MD88 and MD11 aircraft. FIG. 3 shows the forward, mid and aft locations on the aircraft. FIG. 3 shows the location of the placards at forward location, mid location and aft location an a MD88 aircraft. FIG. 4 shows the location of the placards at forward location, mid location and aft location an a MD11 aircraft.

The placards on the aircraft were evaluated after three months or more in service. The placards produced using conventional silk screening methods and the thermal printing system held up equally well on the exterior of the aircraft. Due to the fact that the placards could not be placed in the exact same place on each aircraft, there were some discrepancies in erosion and wear. However both the conventional and thermal printed placards had negligible color loss and fading. The evaluation indicated that all the placards were equivalent. However, the thermal printing process is simpler, more economical, and reduces worker risk by minimizing exposure to solvents.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

We claim:
1. A thermally printed digital placard which comprises:
   an adhesive layer;
   a substrate disposed on the adhesive layer, the substrate comprising polyester, vinyl, polycarbonate or vinyl/polyester;
   a thermally printed image disposed on the substrate; and
   a protective layer disposed on the thermally printed image and substrate, wherein the protective layer is a UV cured coating containing silicone, about 45–70% acrylate resin, and about 1–10% of an adhesion promoter that comprises a monomeric or polymeric diisocyanate.

2. The placard of claim 1, wherein the protective layer further comprises about 0–35% pigments, 0–2% alkylamine, up to 5% photoinitiators and up to 2% antifoam.

3. The placard of claim 1, wherein the diisocyanate is at least one selected from the group consisting of hexamethylene diisocyante (HDI), toluene diisocyanate (TDI), diphenylmethane-4,4'-diisocyanate, 1,5-naphthalene diisocyanate, isophorone diisocyanate, and methyl diphenyl diisocyanate (MDI).

4. The placard of claim 1, wherein the adhesion promoter is polymeric hexamethylene diisocyanate.

5. The placard of claim 1, wherein the placard is mounted on an aircraft.

6. The placard of claim 1, which further comprises an edge sealer when the placard is mounted.

* * * * *